United States Patent
Choi et al.

(10) Patent No.: US 6,635,792 B2
(45) Date of Patent: Oct. 21, 2003

(54) PROCESS FOR PRODUCING AROMATIC HYDROCARBON COMPOUNDS AND LIQUEFIED PETROLEUM GAS FROM HYDROCARBON FEEDSTOCK

(75) Inventors: Sun Choi, Eulsan (KR); Seung-Hoon Oh, Taejon (KR); Yong-Seung Kim, Eulsan (KR); Beung-Soo Lim, Eulsan (KR); Kyeong-Hak Seong, Taejon (KR)

(73) Assignee: SK Corporation, Seoul (KR)

( * ) Notice: Subject to any disclaimer, the term of this patent is extended or adjusted under 35 U.S.C. 154(b) by 128 days.

(21) Appl. No.: 09/989,624

(22) Filed: Nov. 20, 2001

(65) Prior Publication Data

US 2002/0092797 A1 Jul. 18, 2002

(30) Foreign Application Priority Data

Nov. 30, 2000 (KR) .......................... 2000-71959

(51) Int. Cl.$^7$ .......................... C07C 15/12; C07C 4/18; C10G 35/06; C10G 47/00
(52) U.S. Cl. ....................... 585/489; 585/475; 208/137; 208/138; 208/111.1; 208/111.35
(58) Field of Search ................................. 585/489, 475, 585/648, 653; 208/137, 138, 111.1, 111.35

(56) References Cited

U.S. PATENT DOCUMENTS

| | | | |
|---|---|---|---|
| 3,729,409 A | 4/1973 | Chen | 208/135 |
| 3,849,290 A | 11/1974 | Wise et al. | 208/66 |
| 3,950,241 A | 4/1976 | Bonacci et al. | 208/64 |
| 4,058,454 A | 11/1977 | Asselin | 208/321 |
| 5,865,986 A | 2/1999 | Buchanan et al. | 208/65 |
| 6,001,241 A | 12/1999 | Gosling et al. | 208/65 |

*Primary Examiner*—Thuan D. Dang
(74) *Attorney, Agent, or Firm*—Abelman, Frayne & Schwab

(57) ABSTRACT

Disclosed are a process for producing aromatic hydrocarbon compounds and liquefied petroleum gas (LPG) from a hydrocarbon feedstock having boiling points of 30–250° C. and a catalyst useful therefor. In the presence of said catalyst, aromatic components in the hydrocarbon feedstock are converted to BTX-enriched components of liquid phase through hydrodealkylation and/or transalkylation, and non-aromatic components are converted to LPG-enriched gaseous materials through hydrocracking. The products of liquid phase may be separated as benzene, toluene, xylene, and $C_9$ or higher aromatic compounds, respectively according to their different boiling points, while LPG is separated from the gaseous products, in a distillation tower.

17 Claims, 1 Drawing Sheet

PROCESS FOR PRODUCING AROMATIC HYDROCARBON COMPOUNDS AND LIQUEFIED PETROLEUM GAS FROM HYDROCARBON FEEDSTOCK

FIELD OF THE INVENTION

The present invention pertains, in general, to a process for producing aromatic hydrocarbon compounds of liquid phase and non-aromatic hydrocarbon compounds of gas phase, for instance, liquefied petroleum gas (LPG), from hydrocarbon feedstock, and a catalyst useful therefor. More specifically, the present invention pertains to a process for converting aromatic compounds in hydrocarbon feedstock having boiling points of 30–250° C. to oil components including BTX (benzene, toluene and xylene) through dealkylation and/or transalkylation, and for converting non-aromatic compounds to LPG-rich gaseous components through hydrocracking; and a catalyst used in said process.

BACKGROUND OF THE INVENTION

Generally, aromatic hydrocarbons are separated from non-aromatic hydrocarbons by subjecting feedstocks abundantly containing aromatic compounds, such as reformate produced through a reforming process and pyrolysis gasoline obtained from a naphtha cracking process, to solvent extraction. The aromatic hydrocarbons obtained as above is separated as benzene, toluene, xylene, and $C_9$ or higher aromatic compounds, according to their different boiling points, and thus used as fundamental materials of the petrochemical industry. Non-aromatic hydrocarbons are used as raw materials or fuel of the naphtha cracking process.

In this regard, U.S. Pat. No. 4,058,454 refers to a solvent extraction process for separating and recovering polar hydrocarbons from hydrocarbon mixture including polar hydrocarbons and non-polar hydrocarbons. Such solvent extraction process uses polarity of aromatic hydrocarbons to achieve separation. That is, when polar materials-dissolving solvents, such as sulfolane, are contacted with hydrocarbon mixture, polar aromatic hydrocarbons can be selectively dissolved and thus separated from non-polar non-aromatic hydrocarbons. Said process is advantageous in terms of obtaining high purity aromatic hydrocarbon mixture, while is disadvantageous in requiring additional solvent-extraction equipments and continuously feeding solvents during operation of equipment. Therefore, the methods for separating aromatic hydrocarbons and non-aromatic hydrocarbons from raw oils without additional solvent extraction process have been devised.

In particular, much research into reaction systems, instead of solvent extraction processes, for separating aromatic compounds from non-aromatic compounds, has been carried out. Non-aromatic compounds mixed with aromatic compounds are converted to gaseous hydrocarbons in the presence of a catalyst through hydrocracking, and aromatic compounds can be separated from non-aromatic compounds using a gas-liquid separator at the rear end of a reactor. Such concept has been advanced from U.S. Pat. No. 3,729,409. In addition, U.S. Pat. Nos. 3,849,290 and 3,950,241 refer to a method for producing volatile oil components of good quality by converting linear hydrocarbon components mixed with aromatic compounds to gaseous components in the presence of ZSM-5 typed zeolite through hydrocracking, thus increasing the content of aromatics in liquid components. A more developed concept, U.S. Pat. No. 5,865,986 discloses a process for upgrading a petroleum naphtha fraction, in which the production of benzene/toluene is increased by filling zeolite-based catalyst in the parts of a series of reactors during upgrading processes. Also, U.S. Pat. No. 6,001,241 refers to a method for increasing the yield of aromatic compounds by filling zeolite-based catalyst in the parts of reactors during upgrading processes. However, nowhere are found processes taking advantage of such concept as an independent process from reforming reactors aiming exclusively to the production of aromatic compounds. By the process independent from such a reforming reactor, liquefied petroleum gas can be produced, along with aromatic compounds, through the treatment of raw oils such as reformate and pyrolysis gasoline. In countries such as Korea, importing most of liquefied petroleum gas (LPG), considerable amounts of imported energy may be replaced with liquefied petroleum gas produced as by-products of the reaction.

However, said techniques have many limitations to their commercial use. In particular, the sedimentation of coke on the catalyst causes a side reaction, thus shortening the life span of the catalyst. Hence, techniques for overcoming this problem are required. The sedimentation of coke can be restrained by supporting metal components with high hydrogenation activity, such as metals of group VIII in the periodic table, onto zeolite. However, strong hydrogenation activity attributed to such metal components causes another side reaction of converting aromatic compounds to naphthenic compounds through hydrogenation. Therefore, such hydrogenation function by metal components needs to be controlled. Said U.S. Pat. No. 5,865,986 refers to controlling metal activity by use of sulfur compounds. Additionally, in U.S. Pat. No. 6,001,241, the degree of hydrogenation is controlled using lead or bismuth. Under these circumstances, research for controlling hydrogenation activity of VIII group metals by introducing second metal components has been carried out.

SUMMARY OF THE INVENTION

Leading to the present invention, the intensive and thorough research on production of aromatic hydrocarbons and liquefied petroleum gas, carried out by the present inventors aiming to avoid the problems encountered in the prior arts, resulted in the finding that a hydrocarbon feedstock such as reformate, pyrolysis gasoline and the like can be converted to aromatic hydrocarbon compounds of liquid phase and gaseous non-aromatic hydrocarbon compounds in the presence of tin-platinum or lead-platinum supported zeolite-based catalyst, without additional solvent extraction process, thus obtaining aromatic hydrocarbon mixture of high purity and LPG as by-product.

Therefore, it is an object of the present invention to provide a process for producing aromatic hydrocarbons of high purity and liquefied petroleum gas (LPG) as by-product from a hydrocarbon feedstock without solvent extraction.

It is another object of the present invention to provide a process for upgrading aromatic hydrocarbons in a hydrocarbon feedstock such as reformate, pyrolysis gasoline and the like.

It is further object of the present invention to provide a process for converting non-aromatic hydrocarbon components in a hydrocarbon feedstock to LPG-enriched gaseous products in the presence of a catalyst through hydrocracking.

It is still another object of the present invention to provide a zeolite-based catalyst, suitable for use in said process.

In accordance with the present invention, the process for producing aromatic hydrocarbon compounds and liquefied petroleum gas (LPG) from a hydrocarbon feedstock, comprising the following steps of:

a) introducing hydrogen and a hydrocarbon feedstock with boiling points of 30–250° C. to at least one reaction zone;

b) converting the hydrocarbon feedstock in the presence of the catalyst to aromatic hydrocarbon compounds which are abundant in benzene, toluene and xylene (BTX) through hydrodealkylation and/or transalkylation, and to non-aromatic hydrocarbon compounds which are abundant in LPG through hydrocracking within the reaction zone; and c) recovering the aromatic hydrocarbon compounds and LPG, respectively from the resulting products of said step b), through gas-liquid separation and distillation;

wherein said catalyst comprises platinum/tin or platinum/lead and a mixture support consisting of 10–95 wt % of zeolite having a molar ratio of silica/alumina of 200 or less and 5–90 wt % of inorganic binder, said zeolite being selected from the group consisting of mordenite, beta type zeolite, ZSM-5 type zeolite and a mixture thereof, in which said platinum is present at an amount of 0.01–0.5 parts by weight, and said tin is present at an amount of 0.01–5.0 parts by weight or said lead is present at an amount of 0.02–5.0 parts, on the basis of 100 parts by weight of said mixture support.

BRIEF DESCRIPTION OF THE DRAWINGS

The above and other objects, features and other advantages of the present invention will be more clearly understood from the following detailed description taken in conjunction with the accompanying drawing, in which.

DESCRIPTION OF THE PREFERRED EMBODIMENT

Figure 1:
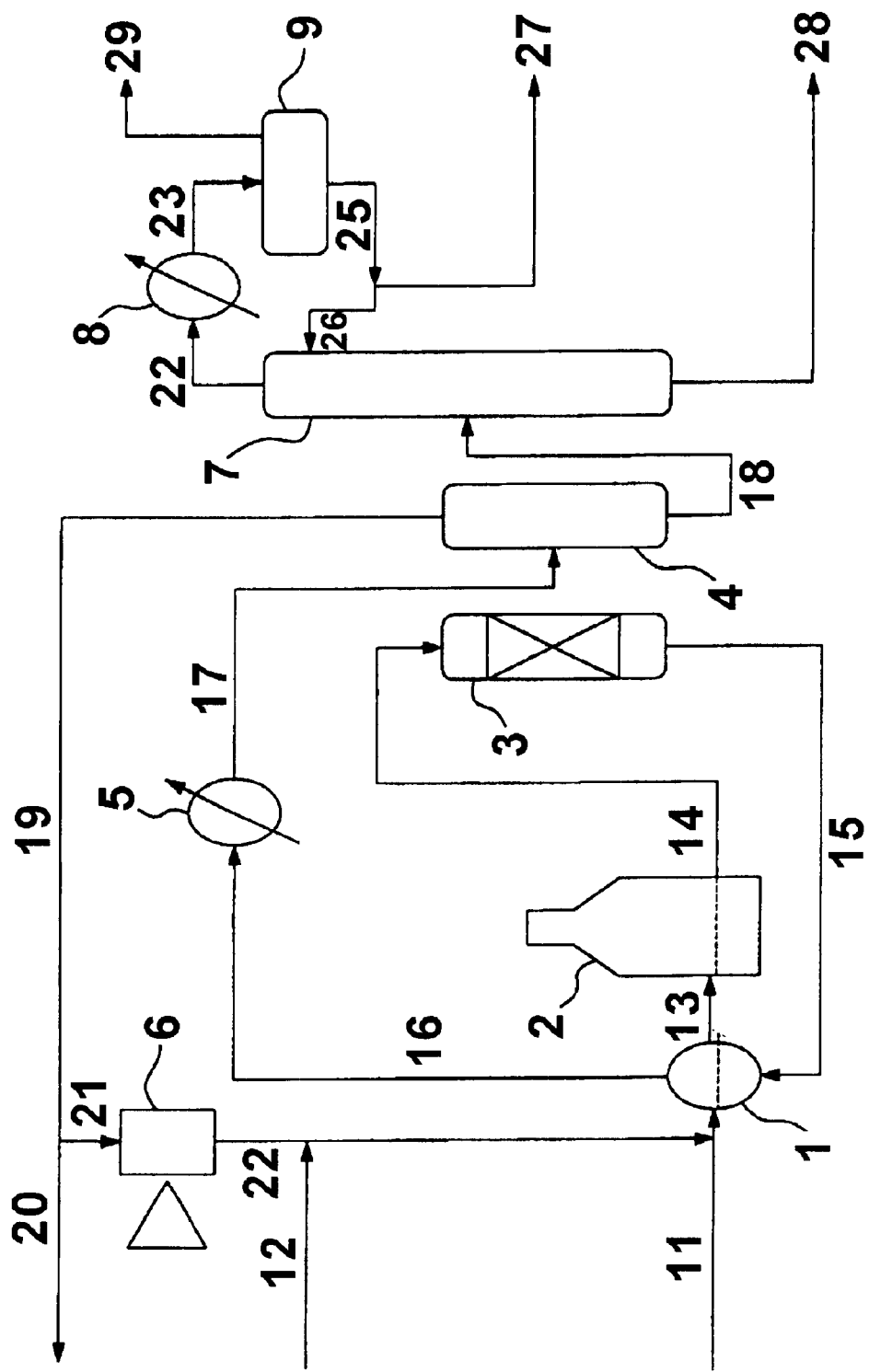
FIG. 1 shows a schematic view of one embodiment of a process for producing aromatic hydrocarbons and liquefied petroleum gas from hydrocarbon feedstock according to the present invention.

The present invention is directed to a process for producing aromatic hydrocarbon compounds and LPG from hydrocarbon feedstock having boiling points of 30–250° C., and a catalyst used in said process. Examples of said hydrocarbon feedstock include reformate, pyrolysis gasoline, $C_9$ or higher aromatic components-containing mixture, naphtha, and a mixture thereof. For obtaining a high yield of aromatics, it is preferred that a feedstock with high content of aromatic components, such as reformate and pyrolysis gasoline, may be used. While, for obtaining LPG mainly, a feedstock with high amounts of non-aromatic components, such as naphtha, may be preferably used. Hydrocracking of non-aromatic hydrocarbon components, and hydrodealkylation and/or transalkylation of aromatic components are simultaneously conducted in the presence of a catalyst according to the present invention. Through said reactions, benzene, toluene and xylene (BTX), which belong to principal aromatic intermediates for the petrochemical industry, can be obtained. At that time, non-aromatic compounds including LPG are yielded as by-products. Of said reactions, hydrocracking is most important because non-aromatic components of liquid phase in the hydrocarbon feedstock are converted into gaseous non-aromatic compounds, which are abundant in LPG, whereby the present invention does not require solvent extraction to refine and recover aromatic hydrocarbon compounds from the resulting products of the aforementioned reactions. Furthermore, the hydrodealkylation and/or transalkylation upgrades the aromatic components in the hydrocarbon feedstock. For instance, $C_9$ or higher aromatic components useful as fuel oil may be converted into benzene, toluene and xylene (BTX) through hydrodealkylation, and the transalkylation between benzene and $C_9$ or higher aromatic compounds yields toluene and xylene.

In accordance with the present invention, said reactions can be carried out by use of zeolite-based catalyst having strong acidic function. Such zeolite-based catalyst has pores of about 5–7 Å, through which the molecules of $C_5$–$C_{12}$ hydrocarbons having boiling points of 30–250° C. can be passed and reacted. A support of the catalyst is used in the form of a mixture support, in which zeolite selected from the group consisting of mordenite, beta type zeolite, ZSM-5 type zeolite, and a mixture thereof is mixed with inorganic binder.

During the hydrocracking and hydrodealkylation as above, olefins such as ethylene, propylene and so on may be produced, and should be rapidly hydrogenated. Otherwise, the olefins will be re-alkylated to aromatic components to result in deteriorating the properties of aromatic components. In addition, the olefins themselves may be polymerized (or oligomerized) to form non-aromatic compounds of liquid phase or to facilitate the formation of cokes which give rise to deactivation of the catalyst. Accordingly, metals with strong hydrogenation function should be contained in the catalyst. Commonly, in the case of requiring strong hydrogenation, use is made of nickel (Ni), palladium (Pd), platinum (Pt) and the like which are metals of group VIII in the periodic table. Of the active metals as mentioned, platinum has the strongest hydrogenation function, so that it is preferably contained in the catalyst, thereby restraining such side reactions.

Meanwhile, in the present invention, platinum allows olefins to rapidly hydrogenate, thus improving properties of reaction products, and suppressing the deactivation of the catalyst caused by the olefins. However, there occurs another side reaction, in which aromatic components are converted to naphthenic hydrocarbons by hydrogenation and/or transalkylation, and then subsequently converted to gaseous paraffins through additional hydrocracking. Such side reactions are undesirable because the amount of aromatic compounds to be recovered is decreased. Therefore, activity of platinum is appropriately adjusted to cause selective hydrogenation of olefins. In order to confer selective hydrogenation function on platinum, tin or lead is used as a second metal component.

Mordenite, beta and ZSM-5, which are useful zeolite in the present invention, are synthesized in sodium forms at first. The sodium forms are subjected to ion-exchange with ammonium chloride or ammonium nitrate to give ammonium forms thereof. These ammonium forms may readily be converted into the form of hydrogen through calcination. In the present invention, used are mordenite, beta type zeolite and ZSM-5 type zeolite in the form of ammonium or hydrogen.

In accordance with the present invention, the mordenite, beta type zeolite and ZSM-5 type zeolite have a molar ratio of silica/alumina of 200 or less. If the molar ratio exceeds 200, the reaction activity becomes so weak that temperature required for the above reactions is significantly increased.

According to the present invention, said zeolites are combined with at least one inorganic binder, which is selected from the group consisting of gamma alumina, silica, silica/alumina, bentonite, kaolin, clinoptilolite, montmorillonite, and a mixture thereof. Preferably, amorphous inorganic oxides of gamma alumina, silica, silica/alumina, and a mixture thereof may be employed. Most preferably, gamma alumina and/or silica are used as inorganic binder.

When said inorganic binder is combined with the zeolite, 10–95 wt % of zeolite is mixed with 5–90 wt % of inorganic binder, and then molded into the shape of a cylinder or sphere with preference. In the case of a cylindrical form, it is preferred that said mixture is molded in a diameter of about 1–3 mm and a length of about 5–30 mm. Further, in the case of sphere form, the mixture is preferably molded in a diameter of about 1–5 mm. As such, if the amount of zeolite is less than 10 wt %, the reaction temperature is drastically elevated. On the other hand, if the amount thereof exceeds 95 wt %, mechanical strength of catalyst becomes poor.

The molded mixture support of zeolite and inorganic binder as above has following physical properties: an apparent bulk density of 0.4–1.0 cc/g, an average pore diameter of 50–200 Å, a pore volume of 0.1–1 cc, and a specific surface area of 200–400 m$^2$/g.

In the present invention, after molding the mixture of zeolite and inorganic binder platinum/tin or platinum/lead may be supported thereonto. Alternatively, metal components may be supported onto the zeolites and then mixed with the inorganic binder to mold a final catalyst. Or all the metals, zeolites and inorganic binder may be mixed before molding.

When metals are supported before or after molding, one of two metal components and then the other metal may be introduced, regardless of introduction order of two metals to be supported. Alternatively, two metals may be simultaneously introduced. For example, said two metals may be combined with the support mixture and then molded together. Alternatively, one of two metals may be combined with the support mixture and molded, followed by introducing the other metal thereon, to give a catalyst.

Platinum, which is the active component of said catalyst, is preferably used at an amount of about 0.01–0.5 parts by weight, on the basis of 100 parts by weight of the mixture support consisting of zeolite and inorganic binder. If the amount of platinum is less than 0.01 parts by weight, the reaction rates of hydrocracking and hydrodealkylation are lowered and thus reaction temperature should be elevated, and deactivation of catalyst is increased. On the other hand, if the amount exceeds 0.5 parts by weight, hydrocracking is vigorously conducted and thus considerable amounts of aromatic components are converted to naphthenic compounds.

Platinum is introduced by an ion-exchange, impregnation, or physical mixing, which can be easily performed by ordinary skilled persons in the relevant art. When platinum is introduced by ion-exchange, aqueous solutions of ammonium chloroplatinate, and dinitrodiaminoplatinum are preferably used as a precursor. In the case of impregnation, aqueous solutions of chloroplatinic acid, and ammonium chloroplatinate, are preferably used as a precursor. When physical mixing is taken, any aqueous solutions of all of said platinum precursors may be used.

In the present invention, tin, playing an important role in controlling the activity of platinum, is preferably added at an amount of about 0.01–5.0 parts by weight based on 100 parts by weight of the mixture support consisting of zeolite and inorganic binder. If the used amount of tin exceeds 5.0 parts by weight, performance of platinum becomes so poor that the deactivation of the catalyst is promoted. On the other hand, if the amount is less than 0.01 parts by weight, strong hydrogenation function of platinum is not appropriately controlled, thereby increasing conversion of aromatic components to naphthenic compounds.

In accordance with the present invention, lead may be used instead of tin, and performs the same functions as tin. In the case of employing lead, it is preferred that about 0.02–5.0 parts by weight of lead is introduced on the basis of 100 parts by weight of the mixture support consisting of zeolite and inorganic binder. If the amount of lead deviates from the above range, the same problems as stated in the case of tin arise.

Preferably, tin or lead is introduced in the mixture support by the impregnation or physical mixing. As precursor thereof, for example tin can be used in the form of tin dichloride, tin tetrachloride, tin acetate, and tin sulfate, and lead in the form of lead acetate, lead nitrate, and lead sulfate.

In the present invention, after platinum/tin or platinum/lead is introduced onto said mixture support, it is preferred that drying is carried out at 60–200° C. under normal atmosphere for 30 minutes to 12 hours. Thereafter, the dried catalyst is calcined at 300–600° C. under air or nitrogen atmosphere, preferably for 1–12 hours.

As aforementioned, a pair of metal components of platinum/tin or platinum/lead are supported onto the mixture support consisting of zeolites and inorganic binder, regardless of introduction order thereof. Instead, it is very important to make the metals associated suitably with each other. In particular, platinum is associated with tin or lead, or is present adjacent to tin or lead to be capable of electrically and chemically affecting each other, rather than independently existing in the catalyst, thereby providing excellent catalytic performance. That is, when platinum exists independently in the catalyst, the side reactions as stated earlier attributable to high hydrogenation activity of platinum, may be caused. However, when platinum is associated with tin or lead, or sufficiently adjacent to tin or lead, selective hydrogenation of platinum is achieved due to interactions between a pair of metal components (Pt/Sn or Pt/Pb) such as ensemble effect or ligand effect.

In FIG. 1, there is shown a schematic view of one embodiment of a process for producing aromatic hydrocarbon compounds and LPG from a hydrocarbon feedstock.

In said FIGURE, the catalyst in accordance with the present invention brings about hydrodealkylation, transalkylation and hydrocracking of the hydrocarbon feedstock in at least one reaction zone. The feedstock containing aromatic and non-aromatic components is mixed with hydrogen before introduction to said reaction zone. At that time, a molar ratio of hydrogen and the feedstock is 0.5–10. The molar ratio less than 0.5 results in rapid deactivation of catalyst, whereas the ratio exceeding 10 results in conversion of aromatic components to saturated cyclic hydrocarbons, thus lowering the yield of aromatic compounds. The hydrocarbon feedstock stream 11 introducing into the process is combined with hydrogen stream 21 and high purity hydrogen stream 12. Further, said feedstock stream 11 flows into a reactor 3 at a weight hourly space velocity (WHSV) of 0.5–10 hr$^{-1}$ and reacted at 250–600° C. under a pressure of 5–50 atm.

In accordance with the embodiment, an additional heater 2 is mounted to increase the temperature of hydrogen/feedstock stream. In a heat exchanger 1, said hydrogen/feedstock stream is heat-exchanged with a reaction product stream 15 which is discharged from the reactor 3 and then circulated to the heat exchanger 1. Thereafter, the stream 13 of the temperature increased to some extent flows in the heater 2.

Within the reactor, into which the heated hydrogen/feedstock 14 flows, hydrodealkylation and transalkylation of aromatic components, and hydrocracking of non-aromatic components are conducted in the presence of the catalyst under the above reaction conditions.

After the completion of reactions, the product 15 is present in gaseous phase of relatively high temperature. Before introduction to a first gas-liquid separator 4, the product is circulated and flows in the heat exchanger 1, in which the temperature of the hydrogen/feedstock stream is increased to some extent due to the product of high temperature. Thereafter, the product passes through a first cooler 5 to give a product stream 17.

The product stream 17 of 30–50° C. flows through the first cooler 5 and into the first gas-liquid separator 4, thus separating gaseous components and liquid components. The gaseous components are discharged from the first gas-liquid separator 4 as a first overhead stream 19, while the liquid components are discharged as a first bottom stream 18. At that time, the gaseous first overhead stream 19 comprise about 60–75 mol % of hydrogen and about 25–40 mol % of hydrocarbon components being composed of methane, ethane, LPG and the like, which have relatively low numbers of carbon atoms. Said hydrogen component is separated and then compressed in a compressor 6 and combined with high purity hydrogen 12 which is introduced to control the purity of hydrogen, followed by introduction to the reaction zone, together with the feedstock 11. Further, LPG components in the first overhead stream 19 are separated and recovered using the conventional methods. Of course, each of methane, ethane, and the like may be separated for use such as fuel.

Meanwhile, the liquid first bottom stream 18 mainly comprises aromatics and contains small amounts of the remaining hydrogen and light non-aromatics. Hence, the liquid first bottom stream 18 passes through a separating-refining operation, in which a second overhead stream 22 comprising the remaining hydrogen and non-aromatics and a second bottom stream 28 comprising aromatics with the purity of 99% or higher are separated according to their boiling points within a first distillation tower 7. The second bottom stream 28 is withdrawn and then can be separated as benzene, toluene, xylene, and $C_9$ or higher aromatic compounds, respectively through further separating operation, for instance using distillation towers (not shown).

Said second overhead stream 22 is cooled in a second cooler 8, and then flows into a second gas-liquid separator 9 to give a gaseous third overhead stream 29 and a liquid third bottom stream 26. The third overhead stream 29 comprising the remaining hydrogen, methane and ethane may be used as fuel. The third bottom stream 26 of liquid phase is re-circulated to the distillation tower 7, and part of the stream is withdrawn as a stream 27 containing pentane, hexane and LPG. The components circulated to the distillation tower 7 again pass through the separating operation, along with the first bottom stream.

Through said processes, aromatic hydrocarbon compounds can be recovered at the purity of 99% or more, and LPG is obtained as the hydrogen-deprived stream 20 of the first overhead stream 19 and the stream 27. As such, approximately 70–90% of the total LPG components recovered are contained in the stream 20.

A better understanding of the present invention may be obtained in light of the following examples which are set forth to illustrate, but are not to be construed to limit the present invention.

EXAMPLE 1

Mordenite with a molar ratio of silica/alumina of 20 was mixed with gamma alumina as an inorganic binder and then molded to give a mixture support in which the amount of mordenite is 75 wt %. During the procedure, aqueous solution of $H_2PtCl_6$ and aqueous solution of $SnCl_2$ were added thereto. At that time, on a basis of 100 parts by weight of the mixture support consisting of mordenite and binder, 0.05 parts by weight of platinum and 0.5 parts by weight of tin were introduced onto the mixture support. After molding into a diameter of 1.5 mm and a length of 10 mm, drying is carried out at 200° C. for 12 hours, followed by calcining at 500° C. for 4 hours, to yield a catalyst.

By use of the catalyst prepared as above, the reaction test was conducted, and the conditions and the results thereof are given in Table 1, below.

EXAMPLE 2

ZSM-5 type zeolite with a molar ratio of silica/alumina of 30 was mixed with gamma alumina as an inorganic binder and then molded to give a mixture support in which the amount of ZSM-5 type zeolite is 75 wt %. During the procedure, aqueous solution of $H_2PtCl_6$ and aqueous solution of $SnCl_2$ were added thereto. At that time, on a basis of 100 parts by weight of the mixture support consisting of ZSM-5 type zeolite and binder, 0.05 parts by weight of platinum and 0.5 parts by weight of tin were introduced onto the mixture support. After molding into a diameter of 1.5 mm and a length of 10 mm, drying is carried out at 200° C. for 12 hours, followed by calcining at 500° C. for 4 hours, to yield a catalyst.

By use of the catalyst prepared as above, the reaction test was conducted, and the conditions and the results thereof are given in Table 1, below.

EXAMPLE 3

ZSM-5 type zeolite with a molar ratio of silica/alumina of 30 was mixed with gamma alumina as an inorganic binder and then molded to give a mixture support in which the amount of ZSM-5 type zeolite is 75 wt %. During the procedure, aqueous solution of $H_2PtCl_6$ and aqueous solution of $Pb(NO_3)_2$ were added thereto. At that time, on a basis of 100 parts by weight of the mixture support consisting of ZSM-5 type zeolite and binder, 0.05 parts by weight of platinum and 0.15 parts by weight of lead were introduced onto the mixture support. After molding into a diameter of 1.5 mm and a length of 10 mm, drying is carried out at 200° C. for 12 hours, followed by calcining at 500° C. for 4 hours, to yield a catalyst.

By use of the catalyst prepared as above, the reaction test was conducted, and the conditions and the results thereof are given in Table 1, below.

EXAMPLE 4

Beta type zeolite with a molar ratio of silica/alumina of 25 was mixed with gamma alumina as an inorganic binder and then molded to give a mixture support in which the amount of ZSM-5 type zeolite is 75 wt %. During the procedure, aqueous solution of $H_2PtCl_6$ and aqueous solution of $SnCl_2$ were added thereto. At that time, on a basis of 100 parts by weight of the mixture support consisting of beta type zeolite and binder, 0.05 parts by weight of platinum and 0.5 parts by weight of tin were introduced onto the mixture support. After molding into a diameter of 1.5 mm and a length of 10 mm, drying is carried out at 200° C. for 12 hours, followed by calcining at 500° C. for 4 hours, to yield a catalyst.

By use of the catalyst prepared as above, the reaction test was conducted, and the conditions and the results thereof are given in Table 1, below.

TABLE 1

CATALYST PERFORMANCE RESULT

|  |  | Ex. 1 | Ex. 2 | Ex. 3 | Ex. 4 |
|---|---|---|---|---|---|
| Reaction conditions |  | Pressure: 27 kg/cm$^2$, WHSV = 2.7 hr$^{-1}$, Molar Ratio of H$_2$/hydrocarbon = 3 | | | |
| Reaction Temp. (° C.) |  | 420 | 410 | 410 | 500 |
| Reaction components (wt %) |  | Non-aromatic: 34.3, C$_6$–C$_8$ aromatic: 51.2, C$_9$ or higher aromatic: 14.5 | | | |
| Product (wt %) | C$_1$–C$_2$ | 13.46 | 14.37 | 10.90 | 12.62 |
|  | LPG | 30.33 | 24.23 | 25.99 | 31.63 |
|  | C$_5$–C$_6$ non-aromatic | 1.05 | 0.82 | 0.44 | 1.45 |
|  | C$_6$–C$_8$ aromatic | 49.04 | 54.65 | 53.99 | 46.68 |
|  | C$_9$– aromatic | 6.13 | 5.94 | 8.68 | 7.62 |

From said table, it can be seen that, when the catalyst of platinum/tin or platinum/lead introduced onto the mixture support consisting of zeolite and inorganic binder is used, C$_7$ or higher non-aromatic components can be effectively converted into gaseous hydrocarbon compounds, such as C$_1$, C$_2$, and LPG, and thus separated from liquid aromatic compounds.

Thus, the process of the present invention using the catalyst as above has advantage of ease of separation of aromatic components and non-aromatic components from a hydrocarbon feedstock by using only a gas-liquid separator and distillation tower without installing additional solvent extraction equipment. In addition, non-aromatic compounds having low utility in the feedstock can be converted to LPG, thereby creating economic benefit. Aromatic compounds having high utility can be obtained with high purities.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A process for producing aromatic hydrocarbon compounds and liquefied petroleum gas (LPG) from a hydrocarbon feedstock, comprising the following steps of:
   a) introducing hydrogen and a hydrocarbon feedstock with boiling points of 30–250° C. to at least one reaction zone;
   b) converting the hydrocarbon feedstock in the presence of a catalyst to aromatic hydrocarbon compounds which are abundant in benzene, toluene and xylene (BTX) through hydrodealkylation and/or transalkylation, and to non-aromatic hydrocarbon compounds which are abundant in LPG through hydrocracking within the reaction zone; and
   c) recovering the aromatic hydrocarbon compounds and LPG, respectively from the resulting products of said step b), through gas-liquid separation and distillation;

wherein said catalyst comprises platinum/tin or platinum/lead and a mixture support consisting of 10–95 wt % of zeolite having a molar ratio of silica/alumina of 200 or less and 5–90 wt % of inorganic binder, said zeolite being selected from the group consisting of mordenite, beta type zeolite, ZSM-5 type zeolite and a mixture thereof, in which said platinum is present at an amount of 0.01–0.5 parts by weight, and said tin is present at an amount of 0.01–5.0 parts by weight or said lead is present at an amount of 0.02–5.0 parts, on the basis of 100 parts by weight of said mixture support.

2. The process as defined in claim 1, wherein a weight hourly space velocity of the hydrocarbon feedstock introduced to the reaction zone is 0.5–10 hr$^{-1}$, and hydrogen/hydrocarbon feedstock is 0.5–10 on the molar basis during said step a).

3. The process as defined in claim 1, wherein said step b) is performed at 250–600° C. under a pressure of 5–50 atm.

4. The process as defined in claim 1, wherein said hydrocarbon feedstock is selected from the group consisting of reformate, pyrolysis gasoline, C$_9$ or higher aromatic mixture, naphtha and a mixture thereof.

5. The process as defined in claim 1, wherein said mixture support consisting of zeolite and inorganic binder has an apparent bulk density of 0.4–1.0 cc/g, an average pore diameter of 50–200 Å, a pore volume of 0.1–1 cc and a specific surface area of 200–400 m$^2$/g.

6. The process as defined in claim 1, wherein said inorganic binder is selected from the group consisting of gamma alumina, silica, silica-alumina, bentonite, kaolin, clinoptilolite, montmorillonite and a mixture thereof.

7. The process as defined in claim 1, wherein said catalyst is prepared by mixing zeolite with inorganic binder to mold a mixture support; supporting tin or lead onto said molded mixture support; and supporting platinum onto said tin or lead-supported mixture support.

8. The process as defined in claim 1, wherein said catalyst is prepared by mixing zeolite with inorganic binder; supporting a mixture of platinum and tin or lead onto the mixture support; and molding said platinum/tin or platinum/lead-supported mixture support.

9. The process as defined in claim 1, wherein said catalyst is prepared by supporting platinum onto zeolite; mixing said platinum-supported zeolite with inorganic binder, followed by molding a platinum-supported mixture support; and supporting tin or lead onto said molded platinum-supported mixture support.

10. The process as defined in claim 1, wherein said catalyst is prepared by mixing zeolite with inorganic binder, followed by molding a mixture support, while supporting one of platinum and tin or lead onto said mixture support; and supporting the other metal, not supported at the previous step, onto said molded mixture support.

11. The process as defined in claim 1, wherein said catalyst is prepared by mixing zeolite, inorganic binder, platinum, and tin or lead; and molding the mixture.

12. The process as defined in claim 1, further comprises separating the aromatic hydrocarbon compounds of the step c) into benzene, toluene, xylene, and C$_9$ or higher aromatic compounds, respectively according to boiling points thereof.

13. A process for producing aromatic hydrocarbon compounds and liquefied petroleum gas from a hydrocarbon feedstock, comprising the following steps of:
   a) introducing hydrogen and a hydrocarbon feedstock with boiling points of 30–250° C., to at least one reaction zone;
   b) hydrodealkylating and/or transalkylating aromatic hydrocarbon components in the feedstock, while hydrocracking non-aromatic hydrocarbon components in the feedstock in the presence of a catalyst within the reaction zone;

c) introducing products discharged from the reaction zone to a gas-liquid separator to provide a first overhead stream comprising hydrogen, methane, ethane and LPG components, and a first bottom stream comprising aromatic hydrocarbon components and a small amount of hydrogen and non-aromatic hydrocarbon components;

d) withdrawing LPG from said first overhead fraction;

e) introducing said first bottom stream to a distillation tower to provide a second overhead stream comprising the remaining hydrogen and non-aromatic hydrocarbon components, and a second bottom stream comprising aromatic hydrocarbon components; and f) withdrawing LPG from said second overhead stream, and aromatic hydrocarbon components from said second bottom stream;

wherein said catalyst comprises platinum/tin or platinum/lead and a mixture support consisting of 10–95 wt % of zeolite having a molar ratio of silica/alumina of 200 or less and 5–90 wt % of inorganic binder, said zeolite being selected from the group consisting of mordenite, beta type zeolite, ZSM-5 type zeolite and a mixture thereof, in which said platinum is present at an amount of 0.01–0.5 parts by weight, and said tin is present at an amount of 0.01–5.0 parts by weight or said lead is present at an amount of 0.02–5.0 parts, on the basis of 100 parts by weight of said mixture support.

14. The process as defined in claim 13, wherein a weight hourly space velocity of the hydrocarbon feedstock introduced to the reaction zone is 0.5–10 $hr^{-1}$, and hydrogen/hydrocarbon feedstock is 0.5–10 on the molar basis during said step a).

15. The process as defined in claim 13, wherein said step b) is performed at 250–600° C. under a pressure of 5–50 atm.

16. The process as defined in claim 13, wherein said hydrocarbon feedstock is selected from the group consisting of reformate, pyrolysis gasoline, $C_9$ or higher aromatic mixture, naphtha and a mixture thereof.

17. The process as defined in claim 13, further comprises:

g) separating the aromatic hydrocarbon components of said step f) into benzene, toluene, xylene, and $C_9$ or higher aromatic compounds, respectively according to boiling points thereof.

* * * * *